United States Patent
Suh

(10) Patent No.: US 7,286,201 B2
(45) Date of Patent: Oct. 23, 2007

(54) LIQUID CRYSTAL DISPLAY

(75) Inventor: Kwang Sik Suh, Daegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/301,727

(22) Filed: Nov. 22, 2002

(65) Prior Publication Data
US 2003/0117565 A1 Jun. 26, 2003

(30) Foreign Application Priority Data
Dec. 22, 2001 (KR) ............... 2001-83239

(51) Int. Cl.
*G02F 1/1345* (2006.01)
*G02F 1/1333* (2006.01)

(52) U.S. Cl. ..................... 349/149; 349/58

(58) Field of Classification Search ........... 349/58–60, 349/149–152
See application file for complete search history.

(56) References Cited

U.S. PATENT DOCUMENTS 4,367,467 A * 1/1983 Emile, Jr. ................ 349/57

6,266,247 B1 * 7/2001 Stockwell et al. .......... 361/724
2002/0159001 A1 * 10/2002 Kim ........................... 349/58

OTHER PUBLICATIONS

Merriam-Webster's Collegiate Dictionary, 10$^{TH}$ Ed., Copyright 2001, p. 1143.*
Merriam-Webster's Collegiate Dicitionary, 10$^{TH}$ Ed., Copyright 1999 at p. 1146.*

* cited by examiner

*Primary Examiner*—Dung T. Nguyen
(74) *Attorney, Agent, or Firm*—McKenna, Long & Aldridge LLP

(57) ABSTRACT

A liquid crystal display module includes a printed circuit board (PCB), a top case installed to cover the upper edge and side surface of the liquid crystal display module, a variable resistance lead part exposed at the front of the top case and controlling common voltage level for preventing a flicker phenomenon from being induced, a brace installed at the side surface of the top case, and at least one protrusion formed at the side surface of the top case and at the area adjacent to the variable resistance lead part.

16 Claims, 6 Drawing Sheets

FIG.2A
RELATED ART

| + | − | + | − | + | − | ... | + | − |
|---|---|---|---|---|---|---|---|---|
| − | + | − | + | − | + | ... | − | + |
| + | − | + | − | + | − | ... | + | − |
| − | + | − | + | − | + | ... | − | + |
| + | − | + | − | + | − | ... | + | − |
| − | + | − | + | − | + | ... | − | + |
| ... | | | | | | | | |
| + | − | + | − | + | − | ... | + | − |
| − | + | − | + | − | + | ... | − | + |

FIG.2B
RELATED ART

| + | + | + | + | + | + | ... | + | + |
|---|---|---|---|---|---|---|---|---|
| − | − | − | − | − | − | ... | − | − |
| + | + | + | + | + | + | ... | + | + |
| − | − | − | − | − | − | ... | − | − |
| + | + | + | + | + | + | ... | + | + |
| − | − | − | − | − | − | ... | − | − |
| ... | | | | | | | | |
| + | + | + | + | + | + | ... | + | + |
| − | − | − | − | − | − | ... | − | − |

FIG.2C
RELATED ART

| + | − | + | − | + | − | ... | + | − |
|---|---|---|---|---|---|-----|---|---|
| + | − | + | − | + | − | ... | + | − |
| + | − | + | − | + | − | ... | + | − |
| + | − | + | − | + | − | ... | + | − |
| + | − | + | − | + | − | ... | + | − |
| + | − | + | − | + | − | ... | + | − |

...

| + | − | + | − | + | − | ... | + | − |
| + | − | + | − | + | − | ... | + | − |

_LIQUID CRYSTAL DISPLAY_

This application claims the benefit of Korean Patent Application No. 2001-83239, filed on Dec. 22, 2001, which is hereby incorporated by reference for all purposes as if fully set forth herein.

BACKGROUND OF THE INVENTION

1. Field of the Invention

The present invention relates to a liquid crystal display, and more particularly to a liquid crystal display capable of preventing a brace and a variable resistance lead part from contacting each other.

2. Discussion of the Related Art

Liquid crystal displays are smaller in size than cathode ray tubes and are used extensively in potable televisions and monitors of lap-top computers. Active matrix liquid crystal displays use thin film transistors (TFTs) as switching devices to display pictures corresponding to video signals (e.g., television signal) inputted to a pixel matrix.

The pixel matrix contains pixels arranged at intersections of gate lines and data lines. Each pixel within the pixel matrix includes a liquid crystal cell that controls light transmittance of a liquid crystal in accordance with a voltage level of a data signal applied from the data line. Installed at intersections of the gate and data lines, TFTs switch the data signal in response to the scanning signal (gate pulse) applied from the gate line to transmit data signals to liquid crystal cells.

Referring to FIG. 1, liquid crystal display panels typically include a plurality of pixel cells (PCE) arranged at intersections of a plurality of gate lines, GL1 to GLm, and a plurality of data lines, DL1 to DLn.

Each pixel cell includes a liquid crystal cell connected to a common voltage line and an auxiliary capacitor (Ca) connected to a corresponding preceding gate line (e.g., GL0 to GLm-1). The liquid crystal cell and the auxiliary capacitor (Ca) are selectively connected to the data lines DL1 to DLn when the TFT is turned on in response to a scanning signal on the gate lines GL1 to GLm.

Liquid crystal cells arranged adjacent one anther on the liquid crystal display panel may be charged with data signals of opposite polarities. As shown in FIG. 2A, in what is known as a dot inversion driving method, each liquid crystal cell is charged with a data signal having a polarity opposite data signals charged within adjacent liquid crystal cells. As shown in FIG. 2B, in what is known as a line inversion driving method, liquid crystal cells connected to the same gate line are charged with data signals having a polarity opposite data signals charged within liquid crystal cells connected to adjacent gate lines. As shown in FIG. 2C, in what is known as a column inversion driving method, liquid crystal cells connected to the same data line are charged with data signals having a polarity opposite that data signals charged within liquid crystal cells connected to adjacent data lines.

Referring to FIG. 3, when the liquid crystal display panel is driven by any of the dot, line, or column inversion driving methods, the polarity of the data signals applied to the liquid crystal cells is inverted at every frame about a common voltage (Vcom), used as a reference voltage. A flicker phenomenon is induced, however, when the polarity of the data signals is inverted and pictures displayed in preceding frames remain within a picture displayed in a current frame. Generally, the flicker phenomenon is induced when positive data signals and negative data signals are not symmetric about the common voltage (Vcom) (i.e., when the voltage difference between the positive data signals and the negative data signals about the common voltage is not zero).

FIGS. 4 and 5 illustrate a plan view and a section view, respectively, of a liquid crystal display capable of preventing inducement of the flicker phenomenon. The liquid crystal display includes a variable resistance lead part 20 installed according to a side mounting method.

Referring to FIGS. 4 and 5, typical liquid crystal display modules include a liquid crystal display panel 12 having an active area where a picture is to be displayed, a backlight unit 14 installed behind the liquid crystal display panel 12 for providing light to the liquid crystal display panel 12, a printed circuit board (PCB) 24 for driving the liquid crystal display panel 12, a variable resistance lead part 20 exposed at the edge of the PCB 24, a top case 16 arranged at the top of the liquid crystal display panel 12 for securing the liquid crystal display panel 12 to the backlight unit 14, and a brace 18 providing a ground potential. Mounting holes 22 are formed to secure the liquid crystal display module to a system.

Mounting holes 22 secure the liquid crystal display module via a side mounting method. Side surfaces of the liquid crystal display module are secured to the system with mounting means (e.g., screw groove) provided by the mounting holes 22 in the side surface of the liquid crystal display module. Using the side mounting method, thickness of the module may be minimized and the active area of the liquid crystal display panel may be maximized.

The liquid crystal display panel 12 is formed by bonding an upper substrate, supporting a color filter array and an alignment film (not shown), and a lower substrate, supporting a TFT array and an alignment film (not shown). The backlight unit 14 converts light generated at a light source such that light incident on the liquid crystal display panel 12 is uniform.

The PCB 24 is located at a rear of the liquid crystal display panel 12 and includes a tape carrier package TCP bent using a tape automated bonding TAB method.

By forming a hole in a front portion of the top case 16, the variable resistance lead part 20 is exposed to the surface of the top case 16. Accordingly, the variable resistance lead part 20 may be easily controlled. The variable resistance lead part 20 controls a common voltage level (e.g., approximately 3-4 V) that is applied to a common electrode in order to prevent the flicker phenomenon from being induced in the liquid crystal display module.

The top case 16 covers an edge and side surface of the liquid crystal display panel 12 in addition to optical components of the backlight unit 14.

Ground potential is supplied to the brace 18 for eliminating the buildup of static electricity within the liquid crystal display module. The brace 18 contacts and grounds the top case 16.

The PCB 24 is located behind the liquid crystal display panel 12 to reduce the outer area of the top case 16 covering the liquid crystal display panel 12. An area of the top case 16 provided in the non-display area is reduced so that the variable resistance lead part 20 contacts the brace 18. Considering that approximately 3~4V is supplied to the variable resistance lead part 20, wherein the variable resistance lead part 20 contacts the brace 18, the variable resistance lead part 20 becomes grounded. Accordingly, the variable resistance lead part 20 fails to prevent the flicker phenomenon from being induced due to its contact with the brace 18.

SUMMARY OF THE INVENTION

Accordingly, the present invention is directed to a liquid crystal display that substantially obviates one or more of the problems due to limitations and disadvantages of the related art.

Accordingly, an advantage of the present invention provides a liquid crystal display capable of preventing a brace and a lead part of a variable resistance for flicker prevention from contacting each other.

In order to achieve these and other advantages, a liquid crystal display includes a liquid crystal display module having a printed circuit board PCB for supplying a driving signal to a liquid crystal display panel; a top case provided to cover an upper edge and side surface of the liquid crystal display module; a variable resistance lead part exposed at the front of the top case for controlling common voltage level for preventing a flicker phenomenon from being induced; a brace installed at the side surface of the top case; and at least one protrusion formed at the side surface of the top case and at the area adjacent to the variable resistance lead part.

In one aspect of the present invention, a side mounting method may be applied to the liquid crystal display.

In another aspect of the present invention, the liquid crystal display may further include a hole exposing the variable resistance lead part on the front of the top case.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

Figures 2A, 2B:
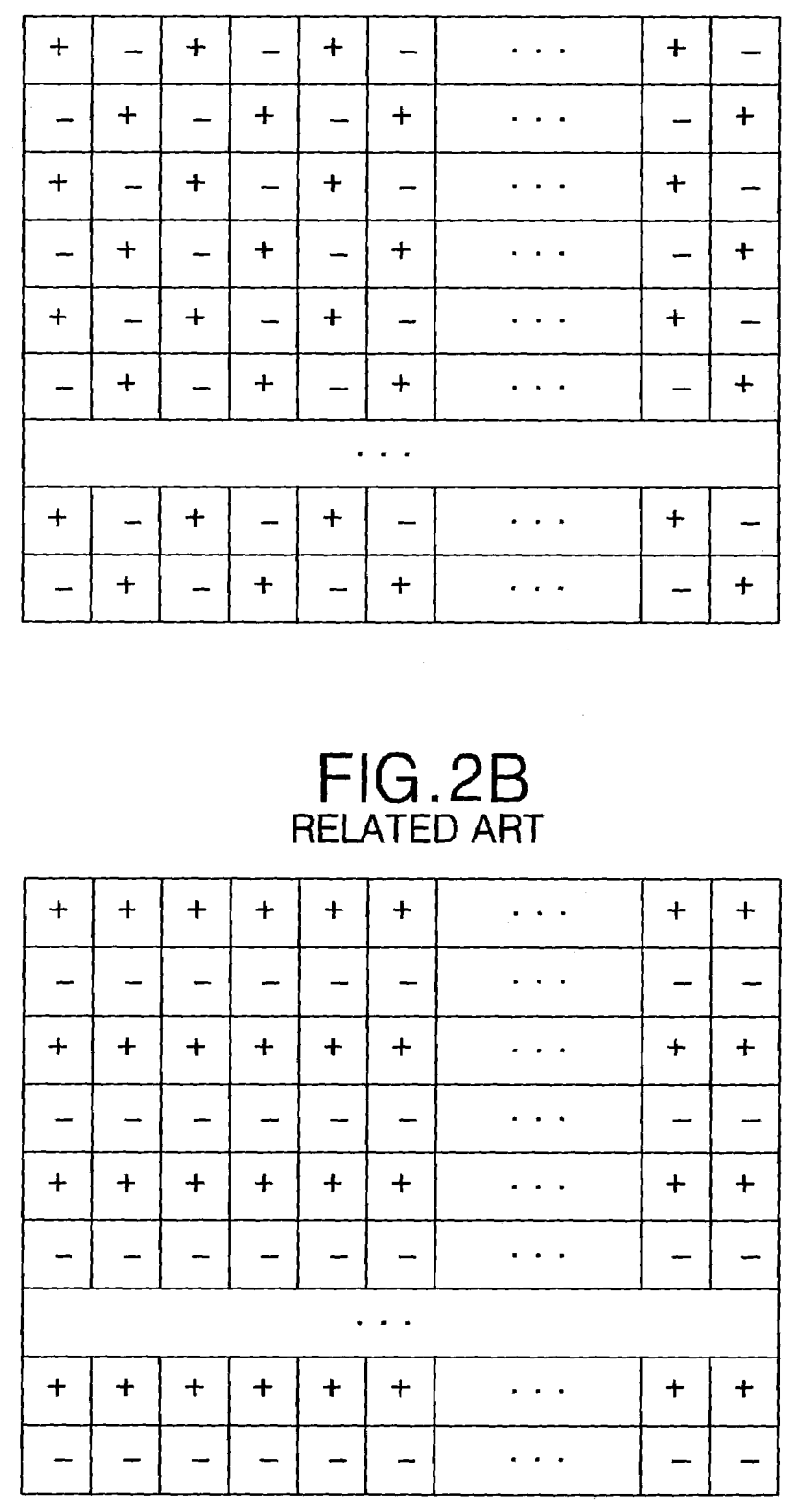
Figure 2C:
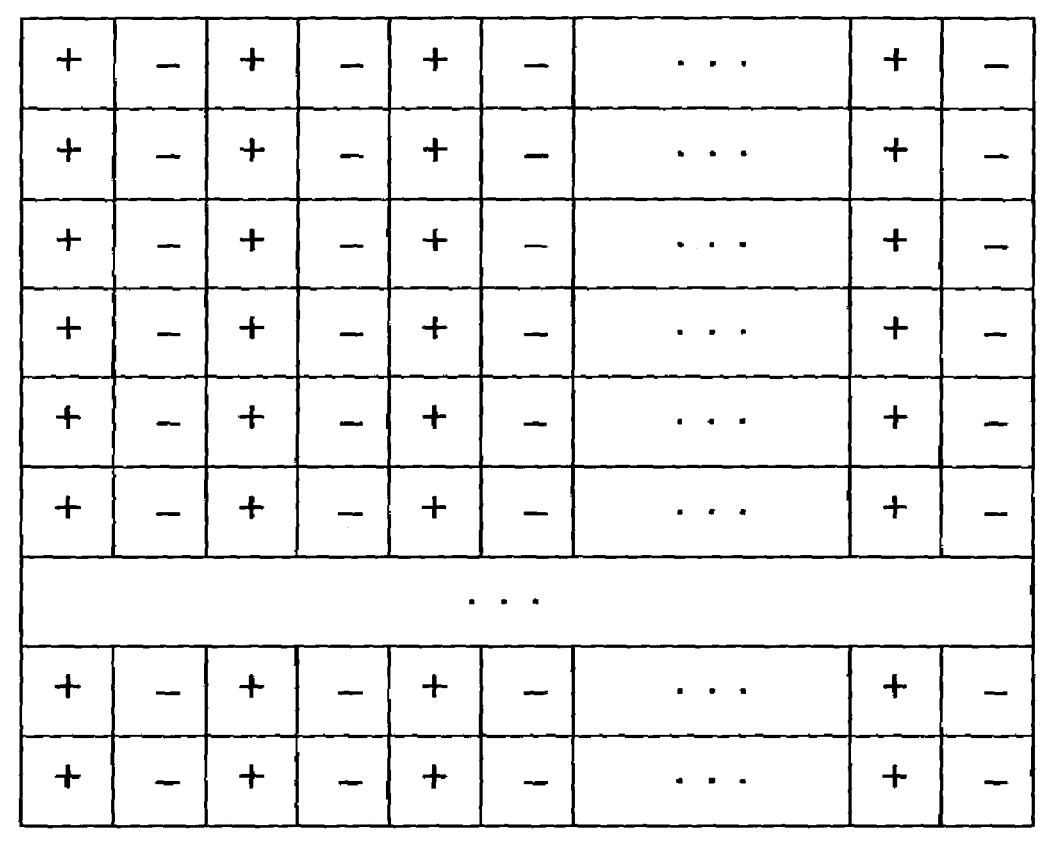

FIG. 2A illustrates a diagram illustrating a dot inversion driving method;

FIG. 2B illustrates a diagram illustrating a line inversion driving method;

FIG. 2C illustrates a diagram illustrating a column inversion driving method;

DETAILED DESCRIPTION OF THE ILLUSTRATED EMBODIMENTS

Reference will now be made in detail to an embodiment of the present invention, example of which is illustrated in the accompanying drawings.

Figure 1:
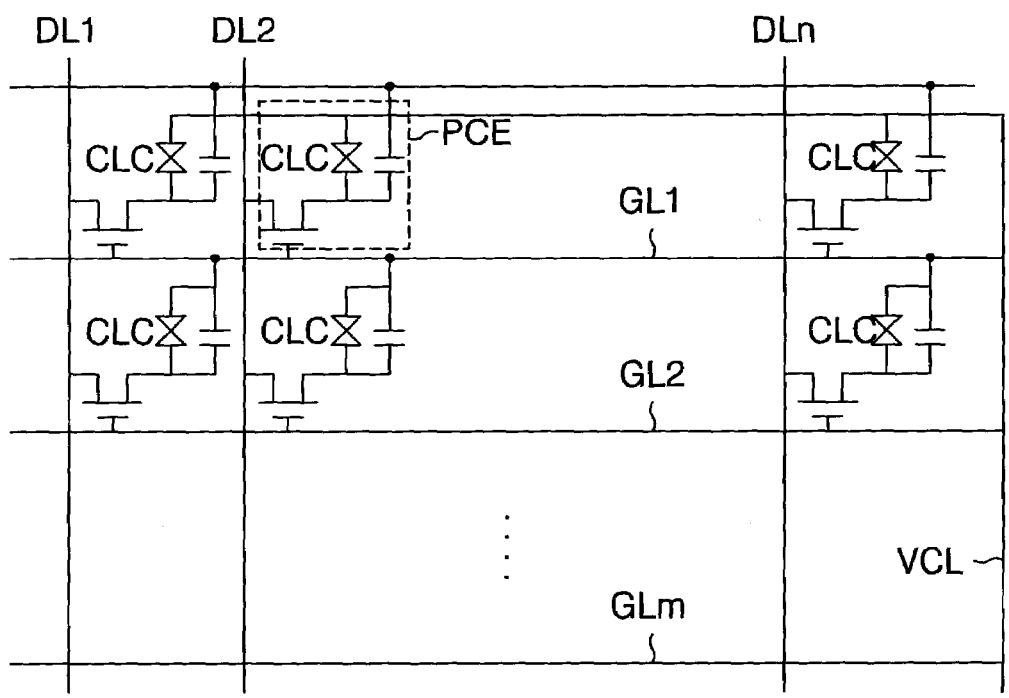
FIG. 1 illustrates a schematic view of a related liquid crystal display panel.
Figure 3:
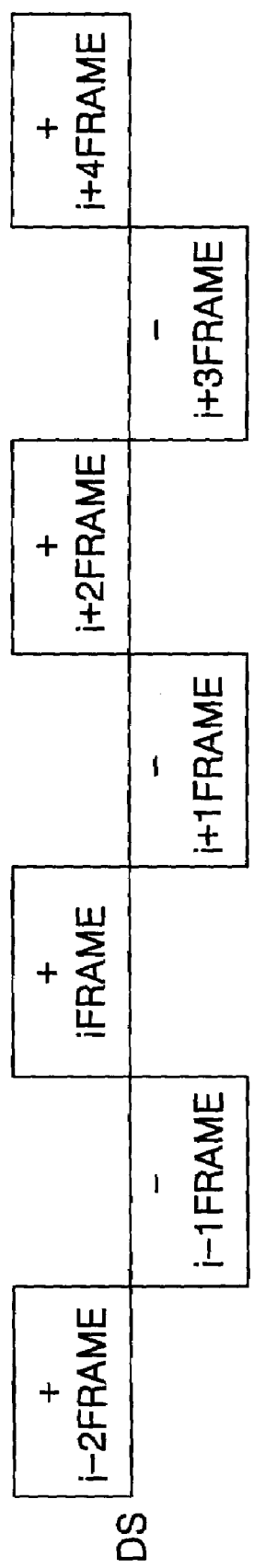
FIG. 3 illustrates a wave form diagram of data signals charged within liquid crystal cells according to the inversion driving methods shown in FIGS. 2A-C.
Figure 4:
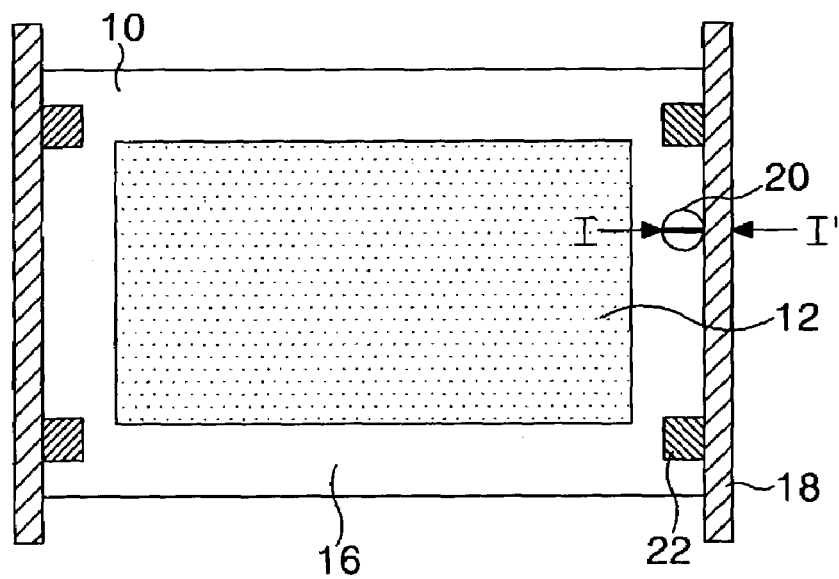
FIG. 4 illustrates a plan view representing a related liquid crystal display.
Figure 5:
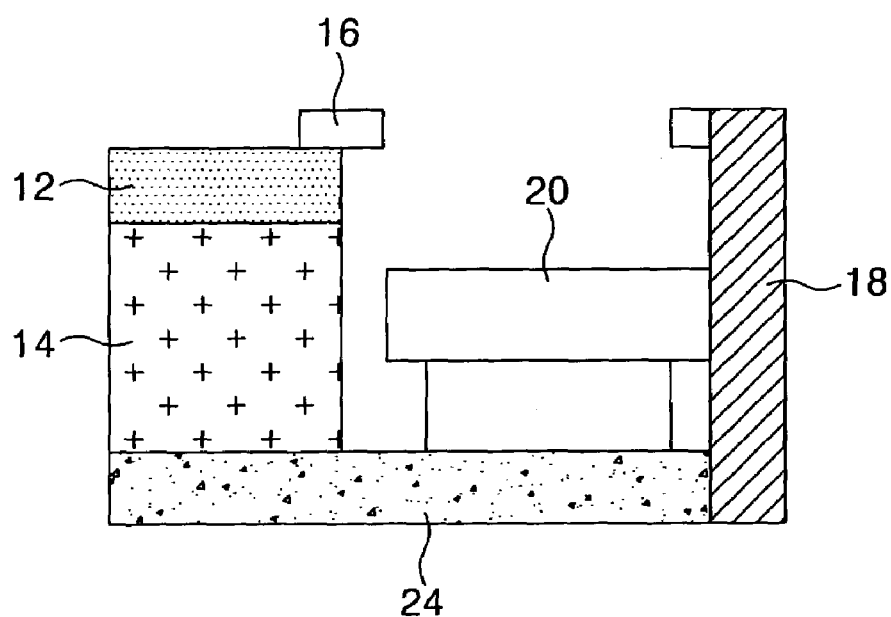
FIG. 5 illustrates a section view along line I-I' of the liquid crystal display shown in FIG. 4.
Figure 6:
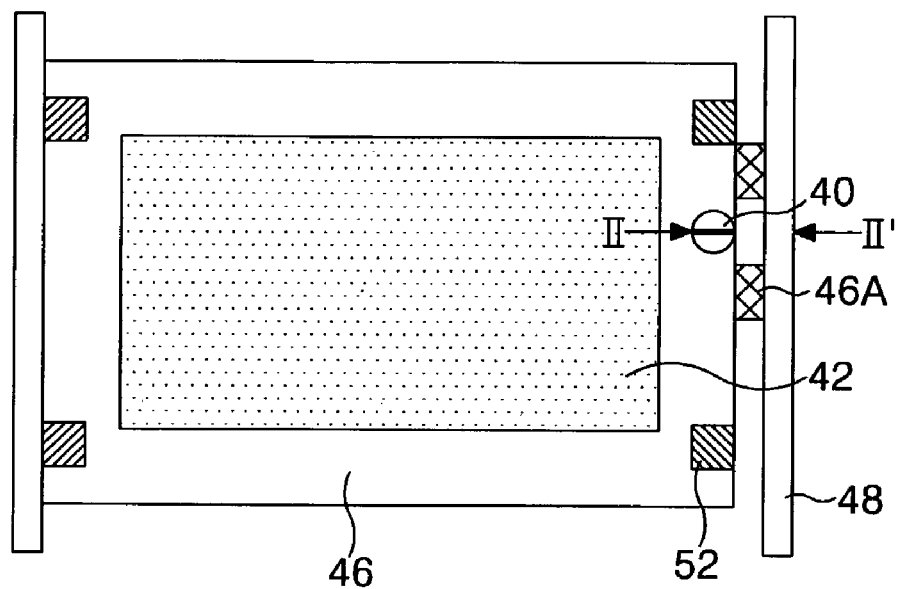
FIG. 6 illustrates a plan view of a liquid crystal display according to an embodiment of the present invention.
Figure 7:
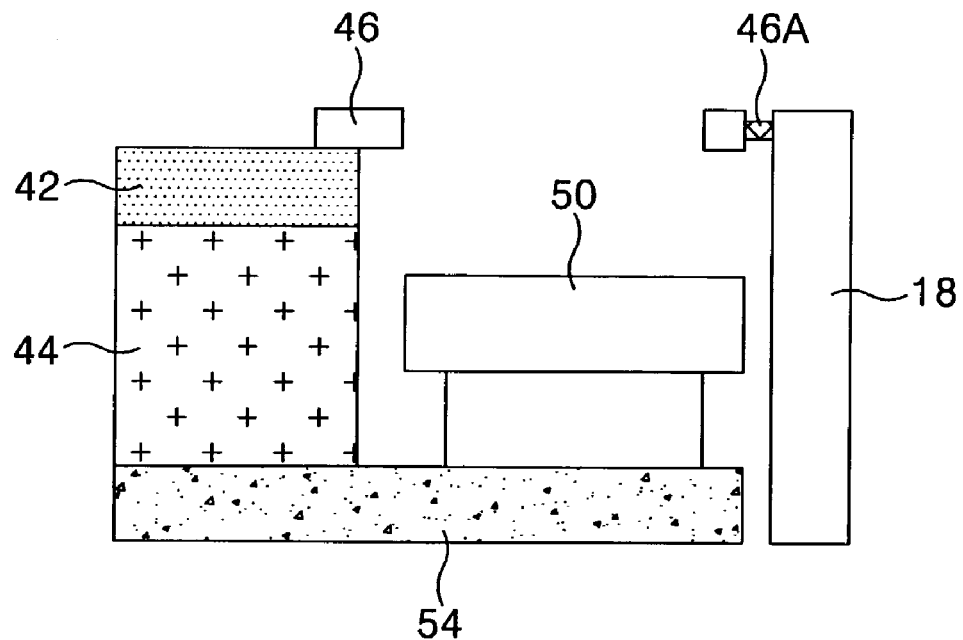
FIG. 7 illustrates a section view along line II-II' of the liquid crystal display shown in FIG. 6.

With reference to FIGS. 6 and 7, embodiments of the present invention are explained as follows.

Referring to FIGS. 6 and 7, a liquid crystal display according to an embodiment of the present invention may, for example, include a top case 46. In one aspect of the present invention, the top case 46 may include at least one protrusion 46A formed on a side surface thereof at an area adjacent to a variable resistance lead part 50.

According to the principles of the present invention, the liquid crystal display may further include, for example, a liquid crystal display panel 42 having an active area where a picture is to be displayed, a backlight unit 44 installed behind the liquid crystal display panel 42 for providing light to the liquid crystal display panel 42, a PCB 54 for driving the liquid crystal display panel 42, a variable resistance lead part 50 exposed at the edge of the PCB 54, and a brace 48 providing a ground potential.

Mounting holes 52 may be formed to secure the liquid crystal display module to a system (not shown). Side surfaces of the liquid crystal display module may be secured to the system with mounting means (e.g., screw groove) provided within the mounting holes 52 arranged in the side surface of the liquid crystal display module. Using the side mounting method, thickness of the module may be minimized and the active area of the liquid crystal display panel may be maximized.

In one aspect of the present invention, the liquid crystal display panel 42 may, for example, be formed by bonding an upper substrate, supporting a color filter array and an alignment film (not shown), with a lower substrate, supporting a TFT array and an alignment film (not shown). The backlight unit 44 may convert light generated at a light source such that light incident on the liquid crystal display panel 42 is uniform.

In one aspect of the present invention, the PCB 54 may, for example, be located at a rear of the liquid crystal display panel 42 and include a TCP bent according to a TAB method.

A hole may be formed in a front portion of the top case 46 to expose the variable resistance lead part 50 to the surface of the top case 46. Accordingly, the variable resistance lead part 50 may be easily controlled via the hole formed in the top case 46. The variable resistance lead part 50 controls a common voltage level (e.g., approximately 3-4V) that is applied to a common electrode in order to prevent the flicker phenomenon from being induced in the liquid crystal display module.

The top case 46 covers an upper edge and side surface of the liquid crystal display panel 42 in addition to optical components of the backlight unit 44. The top case 46 prevents the liquid crystal display panel 42 and the backlight unit 44 from moving within the liquid crystal display module.

At least one protrusion 46A may be formed to extend a predetermined length from a side surface of the top case 46. In one aspect of the present invention, the at least one protrusion electrically contacts the brace 48. Accordingly, the top case may be electrically grounded by contacting the brace via the at least one protrusion 46A. In another aspect of the present invention, the protrusion may be arranged adjacent the variable resistance lead part 50. Due to the presence of the protrusion 46A, the variable resistance lead part 50 does not contact the brace 48. In another aspect of the present invention, the PCB 54 and the brace 48 do not contact each other due to the presence of the protrusion 46A.

Ground potential may be supplied to the brace 48 for eliminating the buildup of static electricity within the liquid crystal display module. If the brace 48 contacts the variable resistance lead part 50, the ground potential is supplied to the variable resistance lead part 50. Accordingly, if ground potential is supplied to the variable resistance lead part 50, the common voltage level cannot be controlled and the flicker phenomenon cannot be prevented from being observed.

In accordance with the principles of the present invention, the variable resistance lead part 50 and the brace 48 are separated by a first predetermined distance due to the presence of the protrusion 46A. In one aspect of the present invention, the first determined distance to which variable resistance lead part 50 and the brace 48 are separated corresponds to the predetermined length to which the protrusion 46A extends. Accordingly, no short-circuit is created between the variable resistance lead part 50 and the brace 48 and the flicker phenomenon may be controlled via the variable resistance lead part 50. In another aspect of the present invention, the PCB 54 and the brace 48 are separated from each other by a second predetermined distance due to the presence of the at least one protrusion 46A. For example, the second predetermined distance to which variable resistance lead part 50 and the brace 48 are separated corresponds to the predetermined length to which the protrusion 46A extends.

As described above, at least one protrusion 46A may be formed at a side surface of the top case to separate the variable resistance lead part 50 from the brace 48. Since brace 48, to which the common voltage level is applied, and the variable resistance lead part, to which a specific voltage is applied, do not interfere with each other, the variable resistance lead part may prevent the flicker phenomenon from being induced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a liquid crystal display panel;
   a printed circuit board (PCB) for supplying a driving signal to the liquid crystal display panel;
   a top case covering an upper edge and side surface of the liquid crystal display panel;
   a variable resistance lead part exposed at a front of the top case and for controlling a common voltage level for preventing flicker;
   a brace arranged at a side surface of the top case; and
   at least one protrusion arranged at the side surface of the top case and adjacent to the variable resistance lead part, wherein the top case and the brace electrically contact each other via the at least one protrusion.

2. The liquid crystal display according to claim 1, wherein a side mounting method is applied to the liquid crystal display.

3. The liquid crystal display according to claim 1, further comprising a hole for exposing the variable resistance lead part on the front of the top case.

4. A liquid crystal display module, comprising:
   a liquid crystal display panel;
   a top case covering an edge of the liquid crystal display panel;
   a variable resistance lead part for preventing a flicker phenomenon from being produced;
   a brace for supplying a ground potential to the liquid crystal display module wherein the variable resistance lead part and the brace are separated by a first predetermined distance; and
   at least one protrusion between the brace and the top case, wherein the brace electrically contacts the top case via the at least one protrusion.

5. The liquid crystal display module according to claim 4, further comprising a hole formed the top case, wherein the variable resistance lead part is exposed by the hole.

6. The liquid crystal display module according to claim 4, wherein the top case comprises:
   a side surface; and
   at least one protrusion formed to extend to a predetermined length from said side surface, wherein the first predetermined distance corresponds to the predetermined length.

7. The liquid crystal display module according to claim 4, wherein the top case comprises:
   a side surface; and at least one protrusion formed to extend to a predetermined length from said side surface, wherein the at least one protrusion contacts the brace.

8. The liquid crystal display module according to claim 4, further comprising a printed circuit board (PCB) for driving the liquid crystal display panel.

9. The liquid crystal display module according to claim 8, wherein the variable resistance lead part is supported by the printed circuit board.

10. The liquid crystal display module according to claim 8, wherein the brace and the printed circuit board are separated by a second predetermined distance.

11. The liquid crystal display module according to claim 10, wherein the top case comprises:
    a side surface; and at least one protrusion formed to extend to a predetermined length from said side surface, wherein the second predetermined distance corresponds to the predetermined length.

12. A liquid crystal display device, comprising:
    a top case for surrounding an active area of a liquid crystal display panel and for covering an upper edge of the liquid crystal display panel, the top case including at least one protrusion;
    a variable resistance lead part for controlling a common voltage level applied to a common electrode; and
    a brace for supplying a ground potential to the top case, wherein the brace does not contact the variable resistance lead part and wherein the brace supplies the ground potential to the top case via the at least one protrusion.

13. The liquid crystal display device according to claim 12, further comprising at least one protrusion arranged between the brace and the top case.

14. The liquid crystal display device according to claim 13, wherein the at least one protrusion is arranged adjacent the variable resistance lead part.

15. The liquid crystal display device according to claim 12, further comprising a printed circuit board for driving the liquid crystal display panel, wherein the printed circuit board does not contact the brace.

16. The liquid crystal display device according to claim 12, further comprising a hole formed in the top case for exposing the variable resistance lead part.

* * * * *